United States Patent
Connell et al.

(10) Patent No.: US 10,284,516 B2
(45) Date of Patent: May 7, 2019

(54) SYSTEM AND METHOD OF DETERMINING GEOGRAPHIC LOCATIONS USING DNS SERVICES

(71) Applicant: CHARTER COMMUNICATIONS OPERATING, LLC, St. Louis, MO (US)

(72) Inventors: Isaiah Connell, St. Louis, MO (US); Guruvayurappan Sriram, St. Louis, MO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 329 days.

(21) Appl. No.: 15/204,460

(22) Filed: Jul. 7, 2016

(65) Prior Publication Data

US 2018/0013716 A1    Jan. 11, 2018

(51) Int. Cl.
*H04L 29/12* (2006.01)
*H04L 29/08* (2006.01)

(52) U.S. Cl.
CPC .......... *H04L 61/1511* (2013.01); *H04L 67/18* (2013.01); *H04L 61/609* (2013.01)

(58) Field of Classification Search
CPC ..... H04L 61/1511; H04L 61/609; H04L 67/18
See application file for complete search history.

(56) References Cited

U.S. PATENT DOCUMENTS

| | | | | |
|---|---|---|---|---|
| 2007/0253377 A1* | 11/2007 | Janneteau | ......... | H04L 29/12066 370/338 |
| 2009/0077383 A1* | 3/2009 | de Monseignat | ... | H04L 63/0823 713/175 |
| 2011/0246483 A1* | 10/2011 | Darr | ........................ | G06Q 10/10 707/748 |
| 2012/0036179 A1* | 2/2012 | Hegde | ................. | H04L 61/1511 709/203 |
| 2012/0036241 A1* | 2/2012 | Jennings | ............. | H04L 61/1511 709/222 |
| 2012/0084449 A1* | 4/2012 | Delos Reyes | ....... | H04L 61/1511 709/229 |
| 2012/0185563 A1* | 7/2012 | Sugiyama | ........... | H04L 12/4641 709/217 |
| 2013/0132498 A1* | 5/2013 | Wainner | .............. | H04L 67/2847 709/208 |
| 2013/0305344 A1* | 11/2013 | Alicherry | ............ | H04L 63/0272 726/12 |
| 2016/0119279 A1* | 4/2016 | Maslak | ............... | H04L 61/1511 709/223 |
| 2017/0111311 A1* | 4/2017 | Bouazizi | ............... | H04L 61/305 |
| 2017/0111851 A1* | 4/2017 | Zhang | ................. | H04L 61/2007 |
| 2017/0289062 A1* | 10/2017 | Artman | ................. | H04L 47/822 |

* cited by examiner

*Primary Examiner* — Alina A Boutah
(74) *Attorney, Agent, or Firm* — Meagher Emanuel Laks Goldberg & Liao, LLP

(57) ABSTRACT

Systems, methods, architectures, mechanisms or apparatus for monitoring DNS services by causing one or more client devices to resolve a unique Fully Qualified Domain Name (FQDN) to collect query records useful in determining client device and DNS service host address and location information.

18 Claims, 5 Drawing Sheets

SYSTEM AND METHOD OF DETERMINING GEOGRAPHIC LOCATIONS USING DNS SERVICES

FIELD OF THE DISCLOSURE

The present disclosure generally relates to communications networks and, more particularly but not exclusively, to monitoring DNS services within a communications network.

BACKGROUND

Large network services providers may use multiple Domain Name System (DNS) servers hosting DNS services for their customers often use a anycast networking technique to provide multiple identical DNS servers or service hosts advertising a common IP address. The multiple identical DNS servers or service hosts may be across the country or across the world.

A router receiving a DNS request may use the anycast protocol to route the DNS request to the "least cost" DNS server or service host. The least cost server or service host may comprise the physically or topologically nearest server or service host, the various cost factors such as network congestion and the like may result in the selection of more distant servers or service hosts. Thus, the anycast protocol provides an extremely efficient and resilient mechanism for providing DNS services to client devices.

When a network services provider is troubleshooting service problems associated with a customer's client device (or client device problems associated with a particular service), it is often important to know which server is hosting the services associated with the client device. For example, the client device may be infected by malware which causes the client device to send DNS requests (or other service requests) to a DNS server (or other service host) not associated with the network services provider. Even if the client device is communicating with an appropriate DNS server or service host, the specific DNS server or service host is not known to the client device since each of the DNS servers or service hosts advertise the same address to the client device. Thus, information specifically identifying the DNS server or service host is generally not known to troubleshooting and/or service personnel, who are then forced to deduce which DNS server or service host is being used by the client device or might otherwise be associated with the service problem.

SUMMARY

Various deficiencies in the prior art are addressed by systems, methods, architectures, mechanisms or apparatus for monitoring DNS services by causing one or more client devices to resolve a unique Fully Qualified Domain Name (FQDN) to collect query records useful in determining client device and DNS service host address and location information.

For example, a method of monitoring Domain Name System (DNS) services according to one embodiment comprises causing a client device to resolve a unique Fully Qualified Domain Name (FQDN); receiving, at a collector service associated with the FQDN, a query record including an IP address associated with the client device and a unicast address associated with a DNS service host; using the IP address associated with the client device to determine a location of the client device; using the unicast address associated with the DNS service host to determine a location of the DNS service host; and storing, in a non-transient computer readable medium, the determined address and location information.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Figure 1:
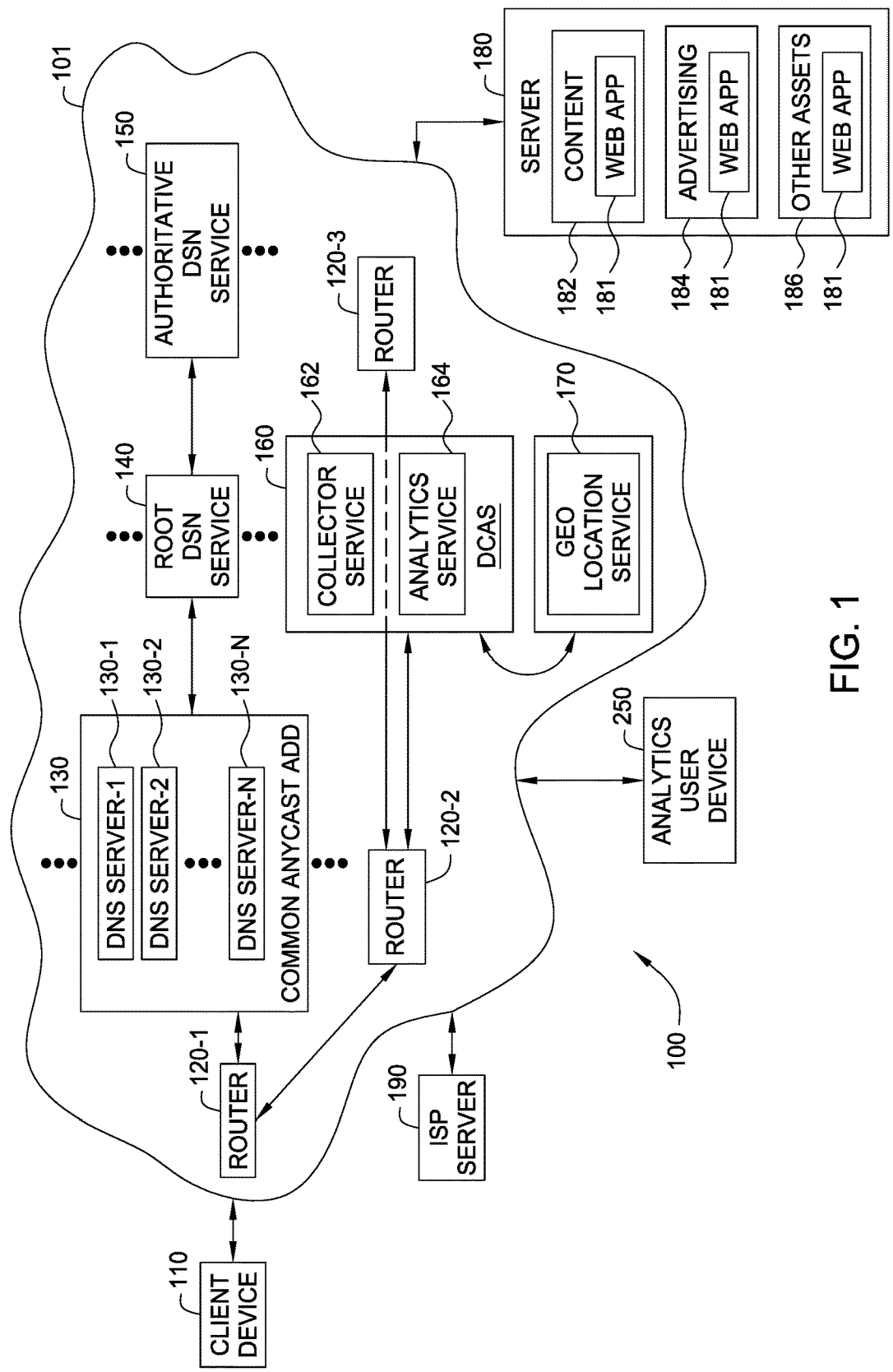
FIG. 1 depicts a high-level block diagram of a system benefiting from various embodiments.

FIG. 1 depicts a high-level block diagram of a system benefiting from various embodiments. Specifically, FIG. 1 depicts a system 100 comprising client device 110 receiving content, advertising and/or other web browser executable assets from an asset server 180 via a network 101. The client device 110 may comprise a computer, smart phone, tablet or other device capable of accessing the network 101 via a web browser such as Internet Explorer, Edge, Chrome, Firefox and the like. The network 101 may comprise various access networks, a core network and so on (e.g., the Internet). The particular details, general topology and standard operation of such network are known to those skilled in the art.

Generally speaking, the network 101 supports the ingress, egress and general transmission therein of data traffic using a plurality of routers 120 (only three routers are shown for simplicity). For example, content from the asset server 180 may be received at ingress router 120-3 and propagated toward the egress router 120-1 via transit router 120-2 and as well as a plurality of other transit routers (not shown).

The plurality of routers 120 depicted within network 101 communicate with each other and form one or more autonomous systems. Each autonomous system may further include a Domain Name System (DNS) to translate human readable Uniform Resource Locators (URLs) or "web addresses" into Internet Protocol (IP) addresses.

In the exemplary system of FIG. 1, a plurality of DNS servers 130-1, 130-2 and so on up to 130-N (collectively DNS servers 130) are used, where each of the DNS servers 130 advertises the same IP address. A router 120, upon receiving from the client device 110 (or some other entity) a URL query associated with a webpage or other resource of interest, determines the nearest or "least cost" DNS server 130 and routes the URL query to that DNS server for processing. Further processing associated with the URL query is performed by one or more root DNS servers 140 and one or more authoritative DNS servers 150, which processing eventually yields the IP address associated with the webpage or other resource of interest. This IP address is provided to the requesting client device 110 for use as a destination address of requests, messages and/or other data to be routed to the webpage or other resource of interest.

The asset server 180 is depicted as including content 182, advertising 184 and other assets 186 where a web app 181 is embedded therein. As will be discussed in more detail below, the web app 181 is configured to trigger client device behavior which results in time and location data associated with the client device and relevant DNS servers being directed to a DNS Collection/Analytics Service (DCAS) entity 160 for collection and analysis.

In various embodiments, the web app 181 associated with browser executable asset such as a content asset 182, advertising asset 184 or other asset 186 is embedded with or otherwise associated with that asset at the asset server 180. Virtually any browser executable asset or portion thereof may be used for this purpose, such as a webpage, an email message, streaming audio or video and so on. In various embodiments, a banner advertisement or in-line HTML code, visible or hidden applet and/or other mechanism suitable for invoking the web app functions as described herein may be included within a webpage, email message and the like.

In various embodiments, the web app 181 is embedded with or otherwise associated with that asset at any of an ingress node, egress node or transit node routing the asset to the client device.

In various embodiments, and Internet Service Provider (ISP) server 190 may be used to serve web apps directly to ISP customers via email, instant messenger or other means. For example, an ISP server 190 or other entity may be used by ISP service personnel to cause transmission of a message to a client device such as a set-top box, computer, smart phone and the like which, when invoked or otherwise processed by the client device, performs various functions described herein with respect to the web app.

The various embodiments find particular applicability within the context DNS servers (or servers providing other services) accessed via the anycast protocol. However, as will be readily appreciated by those skilled in the art, various embodiments may also be used in the context of servers accessed without the unicast protocol, accessed directly and so on. For example, as noted above a ISP server 190 or other entity may be used by ISP service personnel to cause a client device to transmit specific data to the DCAS collector 162 as will be described in more detail below. In this manner, generating a message indicative of client device services and the like may be triggered by sending a message to the client device.

DCAS Services

In the exemplary system of FIG. 1, a DNS Collection/Analytics Service (DCAS) entity 160 is depicted as including a collector service 162 and an analytics service 164. The DCAS service entity 160 cooperate with the geolocation service 170 to enable geographic mapping of client devices, DNS resolvers and other entities. In various embodiments, the DCAS service entity 160, or various components thereof, is implemented at one or more of a DNS server, router, or other server/service device. In various embodiments, the collector service 162 simply monitors a particular port associated with receiving packets and logs the packets and their contents for subsequent processing by the analytics service 164.

Client records typically include any relevant client data, such as subnet, mask, geographic data, ISP, client provided information and so on. Client data is automatically collected by client devices being triggered to resolve a unique Fully Qualified Domain Name (FQDN) generated at the client device, the resolution of which operates to provide client device IP address, timestamp information and/or other information directly to the collector service 162.

With respect to client mapping functions, the analytics service 164 of the DCAS service entity 160 provides mapping of DNS clients to geographical areas by referencing geo location services and/or receiving specific data from an ISP for mapping client IP addresses, Classless Inter-Domain Routing (CIDR) subnets and the like to specific geographical data, such as zip code data, region data, country data, state data, county/province data and/or other geographical data. In various embodiments, the DCAS service periodically updates geo location data such as via automated means on a configurable basis. Similarly, geographic data provided by an ISP is maintained at regular intervals via manual or automated means.

Client records may be maintained by the analytics service 164 and updated with ISP name and location data retrieved via the collector service 162. Client records comprise various information associated with client devices, such as subnet, mask, geographic data, ISP and so on.

With respect to DNS resolver mapping functions, the analytics service 164 of the DCAS service entity 160 provides mapping of DNS resolvers as a byproduct of the information received for mapping client devices. Specifically, an ISP will have DNS recursive services deployed across the ISP network or contracted by a third party to provide customers with a low latency and highly available DNS service. The ISP resolver's location may be learned via geo location services or may be explicitly defined by the ISP to provide greater accuracy. These locations may be assigned a unique color to be represented on visual heat maps as a service cluster of recursive DNS servers. Statistics on latency of cluster (as measured by DCAS entity 160), percentage of usage (as compared to other DCAS sample information) advantageously provides an ISP with data useful in modeling customer to server usage distribution.

Various embodiments contemplate that some ISP DNS clients may be assigned to other recursive DNS servers by the ISP customers. These other DNS server providers are identifiable via WHOIS queries and/or Geo location services using the resolver server IP address. In various embodiments, the overall usage of these resolver servers is tracked to identify a ratio of ISP DNS server usage versus other DNS server providers usage from the DCAS samples received by the collector service 162 and processed by the analytics service 164. An increase in other provider usage may indicate a trend due to service related problems with the ISP DNS servers and should be tracked. Further, tracking the use of other provider usage enables latency measurements associated with other DNS service providers. In the event of one of the other DNS providers having a service outage or impairment, the ISP is not necessarily notified yet the ISP customer may attempt to seek support from the ISP. Tracking these values allows ISP support personnel to properly identify potential impairments associated with non-ISP DNS servers provide the proper fix agent.

Generally speaking, the various embodiments operate to gather information from DNS queries, match the gathered data to geographical or location data associated with query source IP address data to identify or map which client devices are using which servers in substantially real time. In this manner, when changes to the network occur, these changes may be recorded, presented visually to users and/or network managers, used to set traps, used to generate alarms or warnings and so on. Various embodiments provide substantially real time generation of latency statistics and so on useful in troubleshooting. For example, if the network services provider determines that the DNS server accessed by a customer is not one of the DNS servers associated with the provider, the customer may be switched over to a provider DNS server to enable troubleshooting the problem.

Various embodiments contemplate a unique web application or app embedded in or associated with requested content, internet advertisements or other assets, Internet service provider (ISP) specific user facing web services and the like. The web app is configured to trigger, at a client device, a purposefully constructed DNS query when the web app is loaded or invoked via, illustratively, an internet browser program or similar program. The web app may be based on or otherwise comprise XML, Java or any appropriate programming language or mechanism. The web app may be embedded in or associated with the asset or service at an original or caching server providing the asset or service to the client device. The web app may be embedded in or associated with the asset or service by a routing device or other intermediate entity through which the asset or service is propagated toward the client device.

Various embodiments contemplate an collector service 162 configured to receive the purposefully constructed DNS queries triggered at client devices via the web app embedded in or associated with assets or services as described herein. In particular, the collector service receives constructed queries from DNS servers recursing a constructed DNS query and collects geo location data pertaining to the DNS resolvers that originated the DNS query and the DNS recursive servers that are attempting to answer the DNS query for the DNS resolver.

Various embodiments contemplate an analytics service 164 that receives and stores data from one or more collector services in a database (or plurality of databases). The analytics service may be provided to analytics customers a web service or software as a service (SaaS) for the displaying of reports on usage, distribution and latency of anycast DNS services. The analytics service may also be operably interfaced with other applications to enable the other applications to use stored analytics data to produce reports, generate statistics to perform various other functions.

Figure 2:
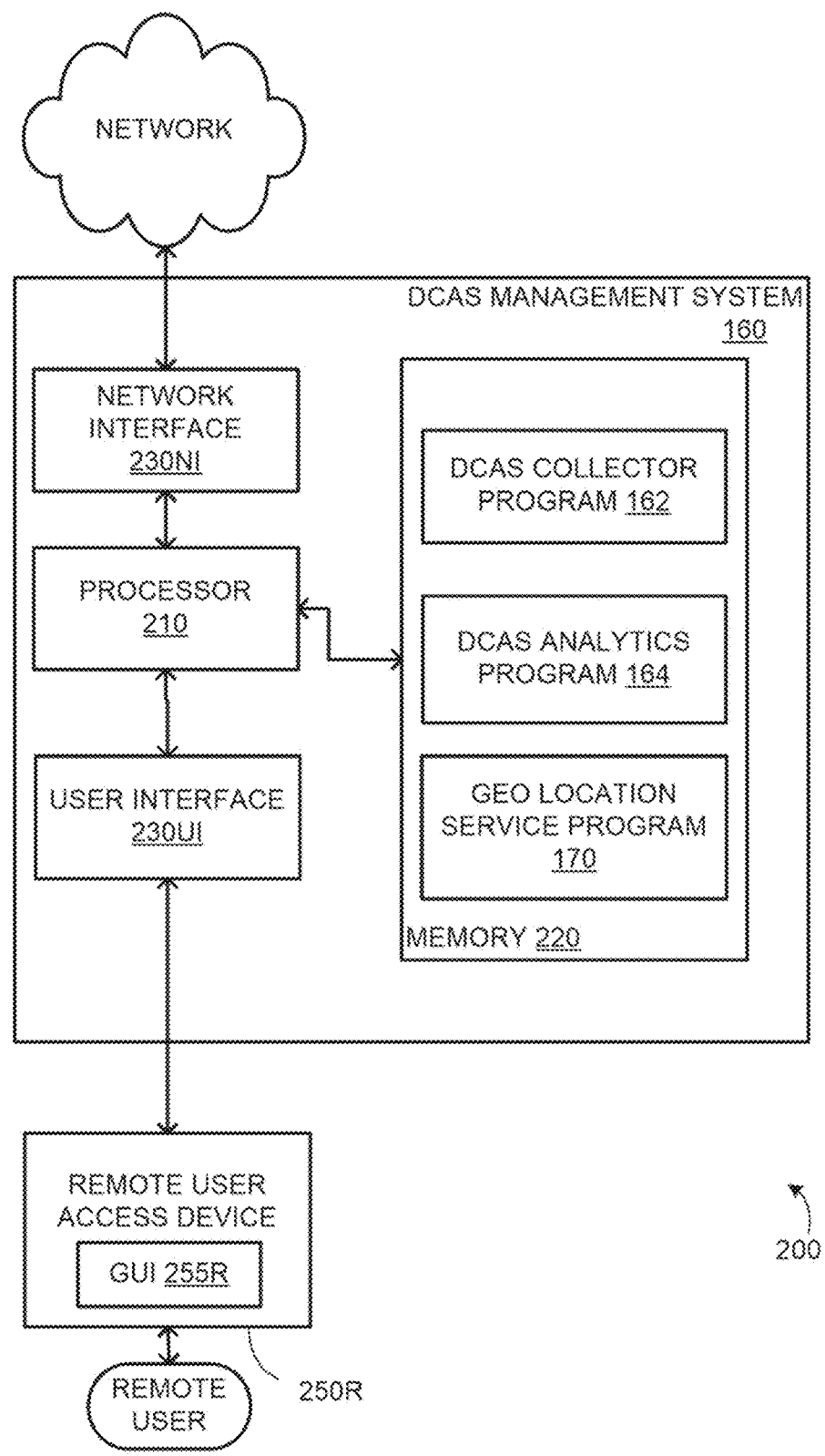
FIG. 2 depicts an exemplary management system (MS) suitable for configuring and delivering a DNS Collection/Analytics Service (DCAS) to an ISP or other customers.

FIG. 2 depicts an exemplary DCAS management system (MS) suitable for configuring and delivering a DNS Collection/Analytics Service (DCAS) to an ISP or other customers.

As depicted in FIG. 2, DCAS MS 160 includes one or more processor(s) 210, a memory 220, a network interface 230N, and an optional user interface 230I. The processor(s) 210 is coupled to each of the memory 220, the network interface 230N, and the user interface 230I.

The processor(s) 210 is adapted to cooperate with the memory 220, the network interface 230N, the user interface 230I, and various support circuits to provide various DCAS functions as described herein.

The memory 220, generally speaking, stores programs, data, tools and the like that are adapted for use in providing various functions as described herein with respect to the figures.

The memory 220 includes various DCAS MS programming modules and databases adapted to implement the DCAS collection and analysis functions described herein, such as an DCAS collector service program 162, and DCAS analytics service program 164 and a geolocation service program 170. Various programs are associated with a database used to store data relevant to client devices, DNS entities and/or other service related entities as described herein.

The network interface 230N is adapted to facilitate communications with various network elements, nodes and other entities within the system 100 to support the DCAS management functions described herein.

The user interface 230I is adapted to facilitate communications with one or more remote user workstations for enabling one or more users to perform DCAS management functions for the system 100. For example, various embodiments, DCAS functions are provided to interested ISPs or other customers to assist in managing their networks and client/subscriber population.

Figure 3:
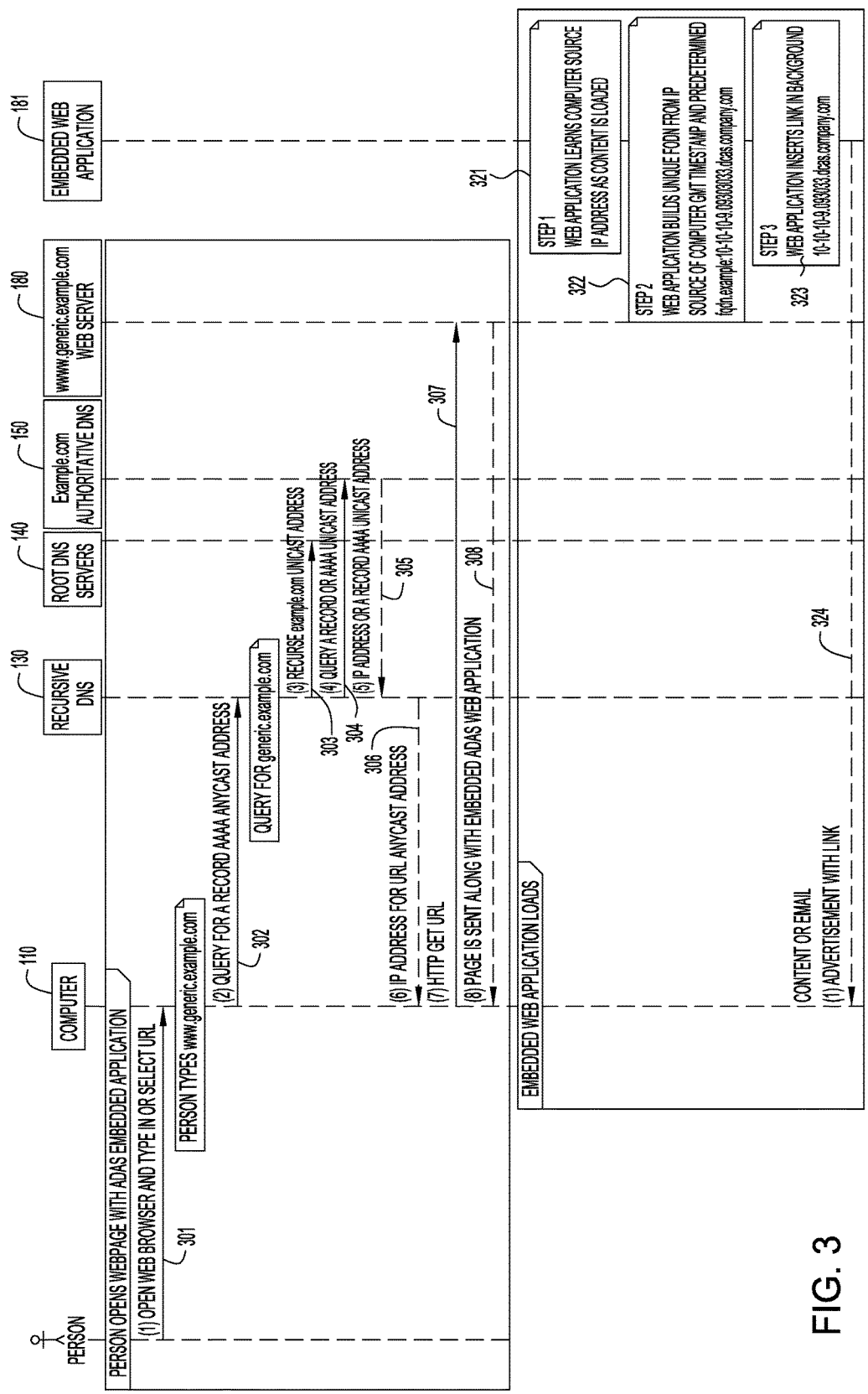
FIGS. 3 and 4 are timing diagrams illustrating communication between a client device and various DNS entities in accordance with various embodiments.

FIG. 3 is a timing diagram illustrating communication between a client device and various DNS entities in accordance with one embodiment. Specifically, FIG. 3 depicts a mechanism by which a web app configured to trigger a purposefully constructed DNS query at a client device is introduced to the client device.

At 301, the user of a client device 110 such as a computer invokes a web browser and enters a desired URL, illustratively a webpage located at www.generic.example.com. At 302, the client device 110 propagates the URL query toward a router, which forwards the URL query to the nearest or "least cost" DNS server 130 as a recursive DNS query. At 303, since the DNS server 130 cannot resolve the URL, the DNS server 130 forwards a root DNS query ("example.com") to a root DNS server 140, which in turn provides to the DNS server 130 a referral to the appropriate authoritative DNS server 150. At 304, the DNS server 130 forwards a DNS query to the authoritative DNS server 150, which at 305 provides to the DNS server 130 the IP address of the URL, illustratively and IPv6 host address (AAAA) resource record. At 306, the DNS 130 provides the IP address to the client device 110.

At 307, the client device 110 uses the provided IP address to transmit a request for the appropriate webpage. At 308, the server hosting the desired webpage transmits that webpage along with an embedded web app to the client device 110.

When the webpage is loaded via a browser invoked at the client device, the embedded web app is also loaded. Specifically, at 321 the web app determines the source IP address of the client device 110 as content associated with the desired webpage is loaded. Determining the IP address of the client device may be performed by the web app querying the asset server 180 which is providing the desired webpage or other content to the client device 110, querying the client device itself, querying related networking entities and so on. In some situations, the IP address of the client device is embedded in the request and is therefore readily available.

At 322, the web app builds or generates a unique Fully Qualified Domain Name (FQDN) using the determined source IP address of the client device 110, a GMT or other timestamp, and a predetermined FQDN (e.g., "dcas.company.com"). In the illustrative example, the example of a unique FQDN built by the web app is: "10-10-10-9.09303033.dcas.company.com".

At 323, the web app cause the browser to resolve the generated unique FQDN, such as by inserting the generated FQDN as a background link in the desired webpage loaded into the client device browser.

At 324, the generated FQDN is resolved at DCAS collector service 162 by the various DNS servers 130, thereby providing relevant client device information and resolver information to the DCAS service 160.

In some embodiments, the client device or client device browser is configured to automatically include the IP address of the client device in the request to resolve the generated unique FQDN. As such, these embodiments there is no need to determine the source address at 321, and the generated FQDN need only include the timestamp and predetermined FQDN (modifying the illustrative example as, e.g., "09303033.dcas.company.com"). In some embodiments, the recursive DNS server 130 is configured to automatically insert the host IP address into any DNS request propagated upstream toward other DNS servers.

Figure 4:
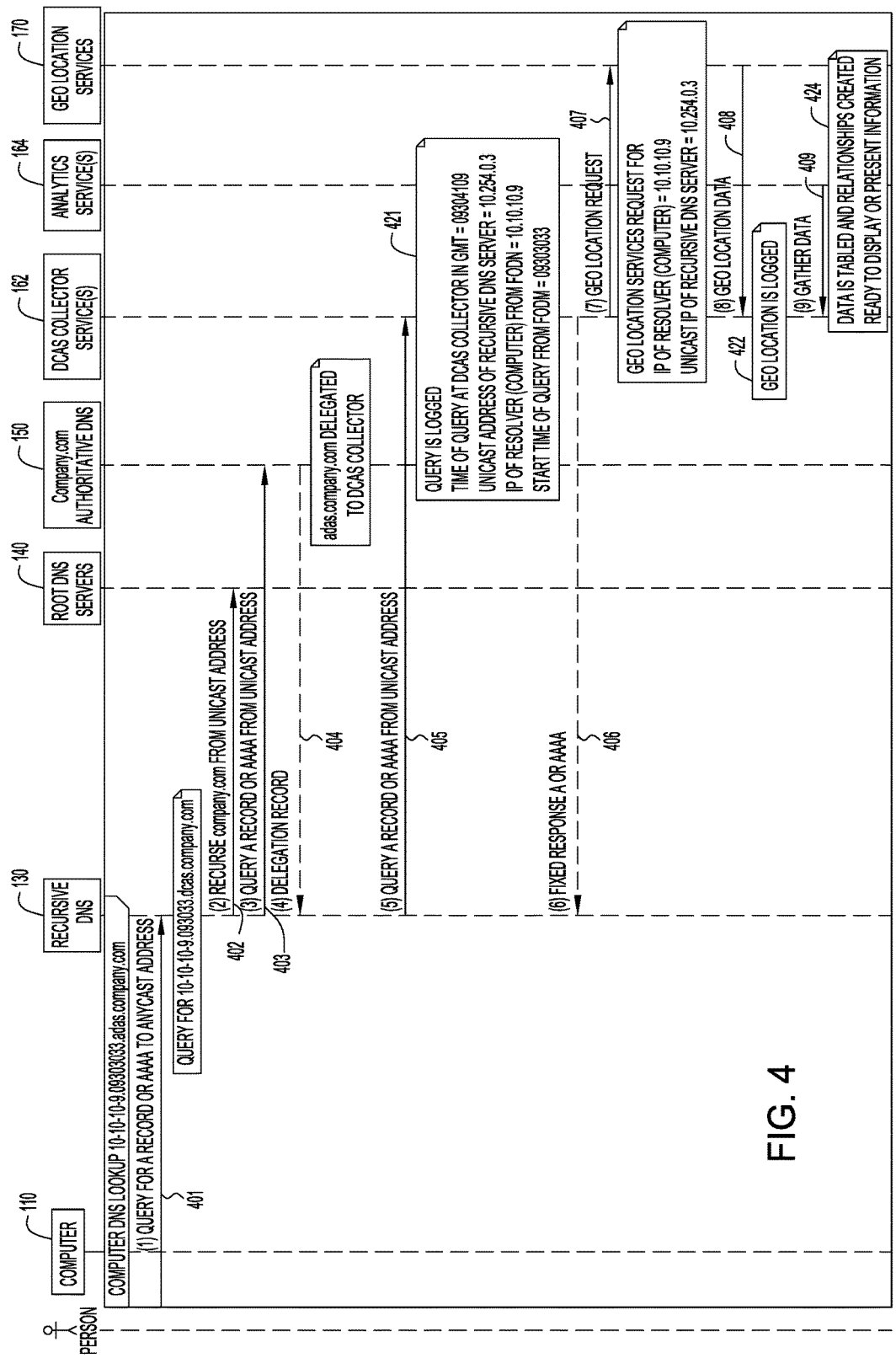

FIG. 4 is a timing diagram illustrating communication between a client device and various DNS entities in accordance with one embodiment. Specifically, FIG. 4 depicts a mechanism by which a purposefully constructed DNS query transmitted by a client device is processed.

At 401, the client device 110 propagates a URL query toward a router, which forwards the URL query to the nearest or "least cost" DNS server 130 as a recursive DNS query to resolve the unique FQDN triggered by the web app as described above. In the illustrative example, the example of a unique FQDN built by the web app is: "10-10-10-9.09303033.dcas.company.com" wherein the IP address of the client devices 10.10.10.9, timestamp is 09303033 and the higher level URL is dcas.company.com.

At 402, since the DNS server 130 cannot resolve the URL, the DNS server 130 forwards a root DNS query ("company.com") to a root DNS server 140, which in turn provides to the DNS server 130 a referral to the appropriate authoritative DNS server 150. At 403, the DNS server 130 forwards a DNS query to the authoritative DNS server 150, which at 404 provides to the DNS server 130 a delegation record wherein dcas.company.com is delegated to DCAS collector service 162.

At 405, the DNS server 130 forwards a DNS query to the delegated DCAS collector service 162 where at 421 the query is logged by the DCAS collector service 162. In particular, log information includes the time of the query itself, the unicast address of the recursive DNS server 130 the IP address of the resolver (i.e., IP address of the computer 110), and the start time of the query as indicated by the timestamp within the FQDN.

It is noted that the unicast address of the recursive DNS server 130 is at this point unknown to the client device 110. The only address known to the client device 110 is the any cast address associated with the DNS server 130 and one or more other DNS servers 130.

At 406, the DCAS collector service 162 provides to the DNS server 130 the resolve IP address of the URL; namely, the IP address associated with the unique FQDN generated at the client device in response to the web app.

At 407, the DCAS collector service 162 transmits to a geolocation service 170 a geolocation request including the IP address of the resolving entity (client device 110) as well as the unicast IP address of the DNS server 130. At 408, the geolocation service 170 identifies the location (e.g., ZIP Code or other geographic location information) of the client device 110 as well as the specific DNS server 130 used by the client device 110 to resolve the URL.

At 422 the geolocation information associated with the client device 110 and DNS server 130 is logged for use by the DCAS analytics service 164. At 409, a data gathering command is issued by the DCAS analytics service 164 propagated toward the DCAS collector service 162. At 424, the DCAS analytics service 164 analyzes existing data and data received from the DCAS collector service 162 to identify relationships, locations of congestion areas, hotspot information and other statistical information for use by DCAS clients or customers. The data may be tabled and relationships created such that a relevant presentation of the data may be provided to clients or customers.

Various embodiments provide improved privacy and security by hashing or otherwise encrypted one or both of the IP address and the timestamp transmitted to the DCAS collector. In this manner, subscriber/client privacy is maintained, system integrity is improved by avoiding the spoofing of IP address and/or date stamp information, and valuable data is secured. In embodiments using hashing/encryption, it is contemplated that the hashing function or encryption algorithm is invoked by the web app or similar client-side functionality which may be triggered as described herein. Similarly, in these embodiments, it is contemplated that hashed or encrypted information is extracted via the DCAS collector 162 or other entity/mechanism.

Various embodiments provide that the web app further operates to hash or otherwise encrypt one or both of the IP address and timestamp associate of the client device prior to closing the client device to resolve the unique FQDN.

Various embodiments provide that the web app further operates to cause the client device to include additional information within the unique FQDN, such as at least one of client device software information and client device hardware information. The client device software information may comprise information identifying one or more of a browser executing said browser executable asset, a version of said browser, a configuration of said browser, an operating environment supporting said browser, a version of said operating environment, a configuration of said operating environment, a status of said operating environment. The client device hardware information may comprise information identifying one or more of a client device identifier, a client device type (e.g., set-top box, smart phone, computer etc.), a client device configuration, a client device status and a client device resource utilization level. Various embodiments provide that the web app is configured to hash or encrypt some or all of the client device software information and client device hardware information included within said unique FQDN.

Various embodiments use functionality other than a web app to cause desired behavior of the client device, such as generating a particular DNS lookup by the client device. For example, in addition to inline HTML code such as via a web advertisement, in line browser messaging platforms may also be used to contact customers as part of a messaging campaign. The campaign might be contacting customers that are delinquent in paying their bill, or may be offering new products to customers and so on.

In various embodiments, an ISP may load or prebuild an application with subscriber identification (e.g., MAC address or modem ID) that meet the criteria of the campaign. A browser messaging appliance is situated within the network in a manner enabling access to customer traffic is capable of identifying when a target customer is browsing the internet. The application then determines the IP address of the target customer and matches the determined IP address to addresses stored within a central repository to identify thereby a subnet ID associated with the target customer. An in-line web page or other element is then presented to the customer as part of the web page actually sought by the customer.

In various embodiments, the in-line web page presented to the customer is configured to perform the web app functions described herein. That is, the in-line browser message may comprise an image, JavaScript or other functional element configured to cause a client device associated with a target customer to generate a DNS lookup as described herein, such as a hashed lookup of the form *.dcas.company.com. In this manner, existing infrastructure including a browser messaging appliance is repurposed to support the various embodiments as described herein.

Various embodiments comprise the use of a targeted email campaign to send emails having images and the like including pre-built, special FQDNs configured to trigger at the target client a DNS lookup as described herein upon the email being opened at the target device.

Various embodiments address the unique opportunity available to large ISPs; namely, the ability to access the last mile of communications link to the customer such that geolocation data may be extremely useful. For example, an ISP may directly trigger client device behaviors via emails, messages, applets and the like such as described above with respect to the ISP server 190 discussed above with respect to FIG. 1. In particular, ISP customers may interact with the DCAS entity to request information pertaining to various client devices of interest, service host devices of interest and so on. In various embodiments, the DCAS entity determines the appropriate client device population and/or service host device population relevant to performing a customer-requested analysis and triggers or otherwise causes selected client devices to generate unique FQDNs designed to provide the appropriate information. The FQDNs are collected and the appropriate information is analyzed to provide a response to the customer request, which response may be transmitted toward the customer, stored locally or remotely for subsequent access by the customer and so on.

Figure 5:
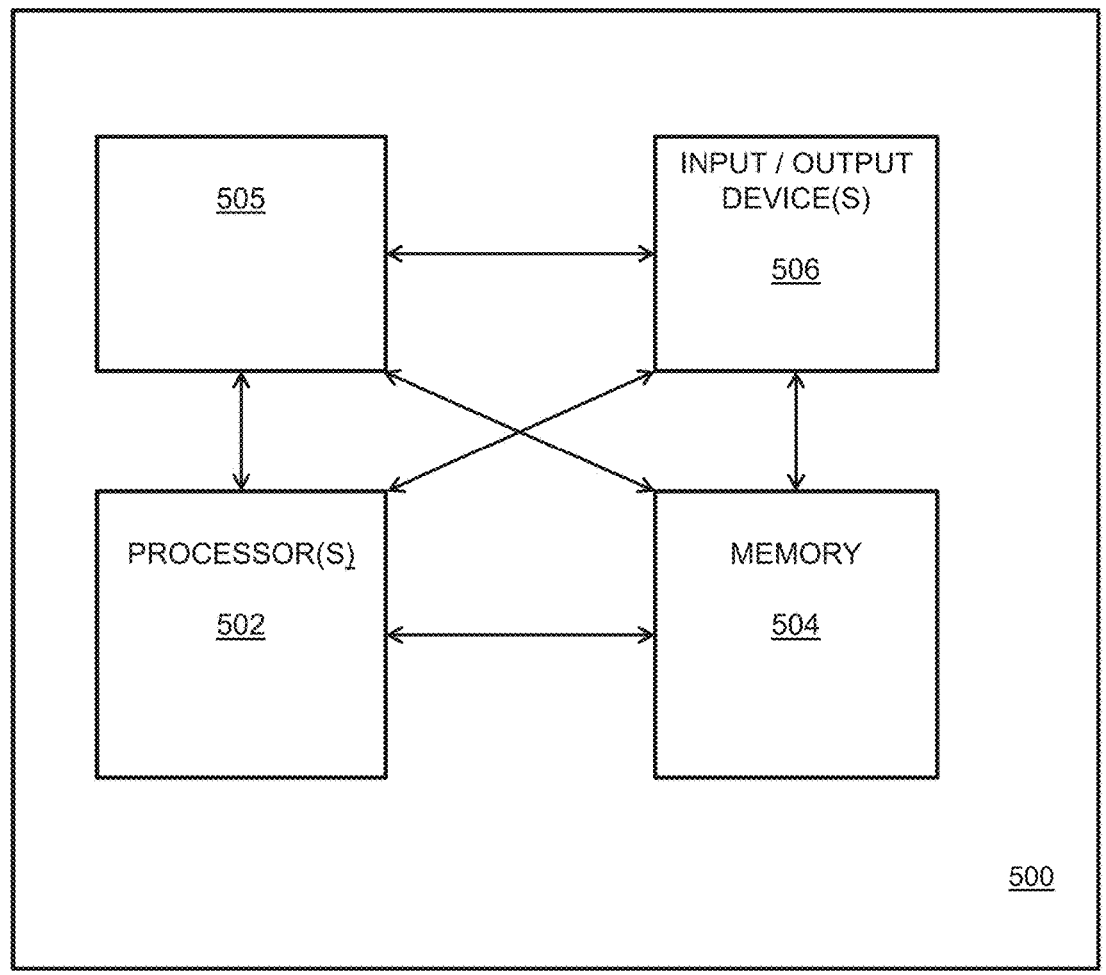
FIG. 5 depicts a high-level block diagram of a computing device suitable for use in performing functions described herein.

FIG. 5 depicts a high-level block diagram of a computing device, such as a processor in a communications network element, suitable for use in performing functions described herein such as those associated with the various elements described herein with respect to the figures.

In particular, any of the various functional entities described herein, such as network routing entities, network management entities, server devices, client devices and so on within the communication network may be implemented in accordance with a general computing device structure such as described herein with respect to the various figures.

As depicted in FIG. 5, computing device 500 includes a processor element 503 (e.g., a central processing unit (CPU) or other suitable processor(s)), a memory 504 (e.g., random access memory (RAM), read only memory (ROM), and the like), a cooperating module/process 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware or in a combination of software and hardware, e.g., using a general purpose computer, one or more application specific integrated circuits (ASIC), or any other hardware equivalents. In one embodiment, the cooperating process 505 can be loaded into memory 504 and executed by processor 503 to implement the functions as discussed herein. Thus, cooperating process 505 (including associated data structures) can be stored on a computer readable storage medium, e.g., RAM memory, magnetic or optical drive or diskette, and the like.

It will be appreciated that computing device 500 depicted in FIG. 5 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method of monitoring Domain Name System (DNS) service requests, comprising:
   causing a client device to resolve a unique Fully Qualified Domain Name (FQDN);
   receiving, at a collector service associated with the FQDN, a query record including IP address associated with the client device and a unicast address associated with a DNS service host;
   using the IP address associated with the client device to determine a geographical location of the client device;
   using the unicast address associated with the DNS service host to determine a geographical location of the DNS service host;
   storing, in a non-transient computer readable medium, the address and geographical location information;
   repeating said method for each of a plurality of client devices to determine thereby address and location information for each client device and corresponding DNS service host; and
   using determined address and location information for each client device and corresponding DNS service host to generate a heat map indicative of DNS service host requests.

2. A method of monitoring Domain Name System (DNS) service requests, comprising:
   causing a client device to resolve a unique Fully Qualified Domain Name (FQDN);
   receiving, at a collector service associated with the FQDN, a query record including IP address associated with the client device and a unicast address associated with a DNS service host;
   using the IP address associated with the client device to determine a geographical location of the client device;
   using the unicast address associated with the DNS service host to determine a geographical location of the DNS service host;
   storing, in a non-transient computer readable medium, the address and geographical location information;
   wherein said DNS service host comprises a plurality of DNS servers advertising a common IP address in accordance with an anycast protocol.

3. A method of monitoring Domain Name System (DNS) service requests, comprising:
   causing a client device to resolve a unique Fully Qualified Domain Name (FQDN);
   receiving, at a collector service associated with the FQDN, a query record including IP address associated with the client device and a unicast address associated with a DNS service host;
   using the IP address associated with the client device to determine a geographical location of the client device;
   using the unicast address associated with the DNS service host to determine a geographical location of the DNS service host;
   storing, in a non-transient computer readable medium, the address and geographical location information;
   wherein causing said client device to resolve a unique FQDN comprises embedding a web app in an browser executable asset transmitted to the client device, said web app configured to cause said client device to generate said unique FQDN.

4. The method of claim 3, wherein said browser executable asset comprises one of a content asset and an advertising asset.

5. The method of claim 3, wherein said web app is embedded within said browser executable asset at an egress node associated with transmitting said browser executable asset to said client device.

6. The method of claim 3, wherein said web app is embedded within said browser executable asset at one of an ingress node or transit node associated with transmitting said browser executable asset to said client device.

7. The method of claim 3, wherein said web app is further configured to cause said client device to include a timestamp and a client device IP address within said unique FQDN.

8. The method of claim 7, wherein said web app is further configured to hash or encrypt said time stamp client device IP address included within said unique FQDN.

9. The method of claim 7, wherein said web app is further configured to cause said client device to include at least one of client device software information and client device hardware information within said unique FQDN.

10. The method of claim 9, wherein said web app is further configured to hash or encrypt client device software information and client device hardware information included within said unique FQDN.

11. The method of claim 9, wherein said client device software information comprises information identifying one or more of a browser executing said browser executable asset, a version of said browser, a configuration of said browser, an operating environment supporting said browser, a version of said operating environment, a configuration of said operating environment, a status of said operating environment.

12. The method of claim 9, wherein said client device hardware information comprises information identifying one or more of a client device identifier, a client device type, a client device configuration, a client device status and a client device resource utilization level.

13. The method of claim 3, wherein said client device is identified by an Internet Service Provider (ISP) as part of a troubleshooting procedure, said troubleshooting procedure including transmitting toward said client device an asset including said web app.

14. The method of claim 13, wherein said method is performed in response to customer interaction with a DNS Collection/Analytics Service (DCAS) platform, said DCAS platform comprising a collector service for receiving unique FQDNs from selected client devices and an analytics service for analyzing the unique FQDNs received from said selected client devices.

15. The method of claim 14, further comprising:
   receiving an analysis request from a customer;
   selecting a plurality of client devices relevant to said analysis request; and
   analyzing unique FQDNs received from said selected client devices to generate information satisfying said customer analysis request; and
   transmitting said generated information toward said customer.

16. An apparatus for monitoring Domain Name System (DNS) service requests, the apparatus comprising:
   a processor configured for:
   causing a client device to resolve a unique Fully Qualified Domain Name (FQDN);

receiving, at a collector service associated with the FQDN, a query record including IP address associated with the client device and a unicast address associated with a DNS service host;

using the IP address associated with the client device to determine a geographical location of the client device;

using the unicast address associated with the DNS service host to determine a geographical location of the DNS service host;

storing, in a non-transient computer readable medium, the address and geographical location information;

wherein said DNS service host comprises a plurality of DNS servers advertising a common IP address in accordance with an anycast protocol.

17. A tangible and non-transient computer readable storage medium storing instructions which, when executed by a computer, adapt the operation of the computer to perform a method of monitoring Domain Name System (DNS) service requests, comprising:

causing a client device to resolve a unique Fully Qualified Domain Name (FQDN);

receiving, at a collector service associated with the FQDN, a query record including IP address associated with the client device and a unicast address associated with a DNS service host;

using the IP address associated with the client device to determine a geographical location of the client device;

using the unicast address associated with the DNS service host to determine a geographical location of the DNS service host;

storing, in a non-transient computer readable medium, the address and geographical location information;

wherein said DNS service host comprises a plurality of DNS servers advertising a common IP address in accordance with an anycast protocol.

18. A computer program product comprising a non-transitory computer readable medium storing instructions for causing a processor to implement a method of monitoring Domain Name System (DNS) service requests, comprising:

causing a processor to implement a method of causing a client device to resolve a unique Fully Qualified Domain Name (FQDN);

receiving, at a collector service associated with the FQDN, a query record including IP address associated with the client device and a unicast address associated with a DNS service host;

using the IP address associated with the client device to determine a geographical location of the client device;

using the unicast address associated with the DNS service host to determine a geographical location of the DNS service host;

storing, in a non-transient computer readable medium, the address and geographical location information;

wherein causing said client device to resolve a unique FQDN comprises embedding a web app in an browser executable asset transmitted to the client device, said web app configured to cause said client device to generate said unique FQDN, said browser executable asset comprising one of a content asset and an advertising asset.

* * * * *